United States Patent
Brooks, Jr.

(10) Patent No.: US 11,459,791 B1
(45) Date of Patent: Oct. 4, 2022

(54) SYSTEMS AND DEVICES FOR A SHOPPING CART CORRAL

(71) Applicant: William S. Brooks, Jr., Chicago, IL (US)

(72) Inventor: William S. Brooks, Jr., Chicago, IL (US)

(*) Notice: Subject to any disclaimer, the term of this patent is extended or adjusted under 35 U.S.C. 154(b) by 0 days.

(21) Appl. No.: 17/238,839

(22) Filed: Apr. 23, 2021

(51) Int. Cl.
  *B62B 3/04* (2006.01)
  *E04H 17/18* (2006.01)
  *B62B 3/14* (2006.01)

(52) U.S. Cl.
  CPC .......... *E04H 17/18* (2013.01); *B62B 3/1404* (2013.01)

(58) Field of Classification Search
  CPC ......... A47F 10/04; B62B 3/14; B62B 3/1404; E04H 17/18
  See application file for complete search history.

(56) References Cited

U.S. PATENT DOCUMENTS

| | | | | |
|---|---|---|---|---|
| 3,051,336 A * | 8/1962 | Felsten | ................ | B62B 3/1404 414/537 |
| 4,609,183 A * | 9/1986 | Ulmer | ................ | A47F 10/04 256/25 |
| 5,201,426 A * | 4/1993 | Cruwell, Jr. | ................ | A47F 10/04 211/195 |
| 5,791,669 A * | 8/1998 | Broddon | ................ | B62B 5/04 280/33.992 |
| 5,862,921 A * | 1/1999 | Venegas Jr. | ................ | A47F 10/04 211/17 |
| 6,090,218 A * | 7/2000 | Brackmann | ................ | G06Q 30/0238 134/201 |
| 6,581,616 B1 * | 6/2003 | Venegas, Jr. | ................ | A47F 10/04 135/121 |
| 2003/0059288 A1 * | 3/2003 | Robinson | ................ | B66F 9/12 414/539 |
| 2006/0011220 A1 * | 1/2006 | Mueller | ................ | B08B 3/022 134/123 |
| 2006/0197295 A1 * | 9/2006 | Holtan | ................ | B62B 3/1404 280/33.991 |
| 2010/0078905 A1 * | 4/2010 | Holtan | ................ | B62B 3/00 280/47.11 |
| 2016/0270563 A1 * | 9/2016 | Contrata, Jr. | ................ | H02J 7/35 |
| 2019/0207427 A1 * | 7/2019 | McNeally | ................ | H02J 50/402 |

* cited by examiner

*Primary Examiner* — Brian L Swenson
(74) *Attorney, Agent, or Firm* — Foley & Lardner LLP

(57) ABSTRACT

Systems and devices for a shopping cart corral include a movable frame defining an interior space sized to receive one or more shopping carts arranged along a lengthwise direction in the interior space. The movable frame may include a first wall including a first post, a second post, and a first bracket extending between the first post and the second post. The movable frame may include a second wall including a third post, a fourth post, and a second bracket extending between the third post and a fourth post. The movable frame may include a third wall having a third bracket extending between the first post and the third post. The movable frame may include a door extending between the second post and the fourth post. The shopping cart corral may include a plurality of wheels positioned on the each of the posts.

19 Claims, 7 Drawing Sheets

SYSTEMS AND DEVICES FOR A SHOPPING CART CORRAL

BACKGROUND

The present disclosure relates generally to a cart corral. More specifically, the present disclosure relates to systems and devices for a shopping cart corral.

Shopping carts are often located in a parking lot of a shopping space (such as a grocery store, convenience store, hardware store, wholesale store, or other shopping locations), or at an entrance of a shopping space. Customers of the shopping space typically obtain the shopping cart from the parking lot or at the entrance, place items in the shopping cart until payment and load the items into their vehicle. Once the customers are finished using the shopping cart, some customers will leave the shopping cart adjacent their vehicle, while other customers may move the shopping cart to a designated location in the parking lot. Typically, the designated location occupies a parking space and is designed to receive several shopping carts in both length-wise and width wise directions. Some designated locations may include interior walls, which define channels or lanes for receiving the shopping carts.

SUMMARY

At least one embodiment relates to a shopping cart corral. The shopping cart corral may include a movable frame defining an interior space sized to receive one or more shopping carts arranged along a lengthwise direction in the interior space. The movable frame may include a first expandable wall configured to expand in the lengthwise direction. The first expandable wall may have a first post, a second post, and a first extendable bracket extending between the first post and the second post. The movable frame may include a second expandable wall configured to expand in the lengthwise direction. The second expandable wall may have a third post, a fourth post, and a second extendable bracket extending between the third post and a fourth post. The movable frame may include a third wall having a third bracket extending between the first post and the third post. The movable frame may include a door extending between the second post and the fourth post and configured to open and close to selectively expose the interior space. The shopping cart corral may include a plurality of wheels including a first wheel positioned on the first post, a second wheel positioned on the second post, a third wheel positioned on the third post, and a fourth wheel positioned on the fourth post.

Another embodiment relates to a shopping cart corral. The shopping cart corral may include a movable frame defining an interior space sized to receive one or more shopping carts arranged along a lengthwise direction in the interior space. The movable frame may include a first wall having a first post, a second post, and a first bracket extending between the first post and the second post. The movable frame may include a second wall having a third post, a fourth post, and a second bracket extending between the third post and a fourth post. The movable frame may include a third wall having a third bracket extending between the first post and the third post, the third wall comprising a light source. The movable frame may include a door extending between the second post and the fourth post and configured to open and close to selectively expose the interior space. The shopping cart corral may include a plurality of wheels including a first wheel positioned on the first post, a second wheel positioned on the second post, a third wheel positioned on the third post, and a fourth wheel positioned on the fourth post.

Another embodiment relates to a shopping cart system. The shopping cart system may include a plurality of shopping carts. The shopping cart system may further include a shopping cart corral sized to receive one or more of the plurality of shopping carts. The shopping cart corral may include a movable frame defining an interior space sized to receive one or more shopping carts arranged along a lengthwise direction in the interior space. The movable frame may include a first expandable wall configured to expand in the lengthwise direction. The first expandable wall may have a first post, a second post, and a first extendable bracket extending between the first post and the second post. The movable frame may include a second expandable wall configured to expand in the lengthwise direction. The second expandable wall may have a third post, a fourth post, and a second extendable bracket extending between the third post and a fourth post. The movable frame may include a third wall having a third bracket extending between the first post and the third post. The movable frame may include a door extending between the second post and the fourth post and configured to open and close to selectively expose the interior space. The shopping cart corral may include a plurality of wheels including a first wheel positioned on the first post, a second wheel positioned on the second post, a third wheel positioned on the third post, and a fourth wheel positioned on the fourth post.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
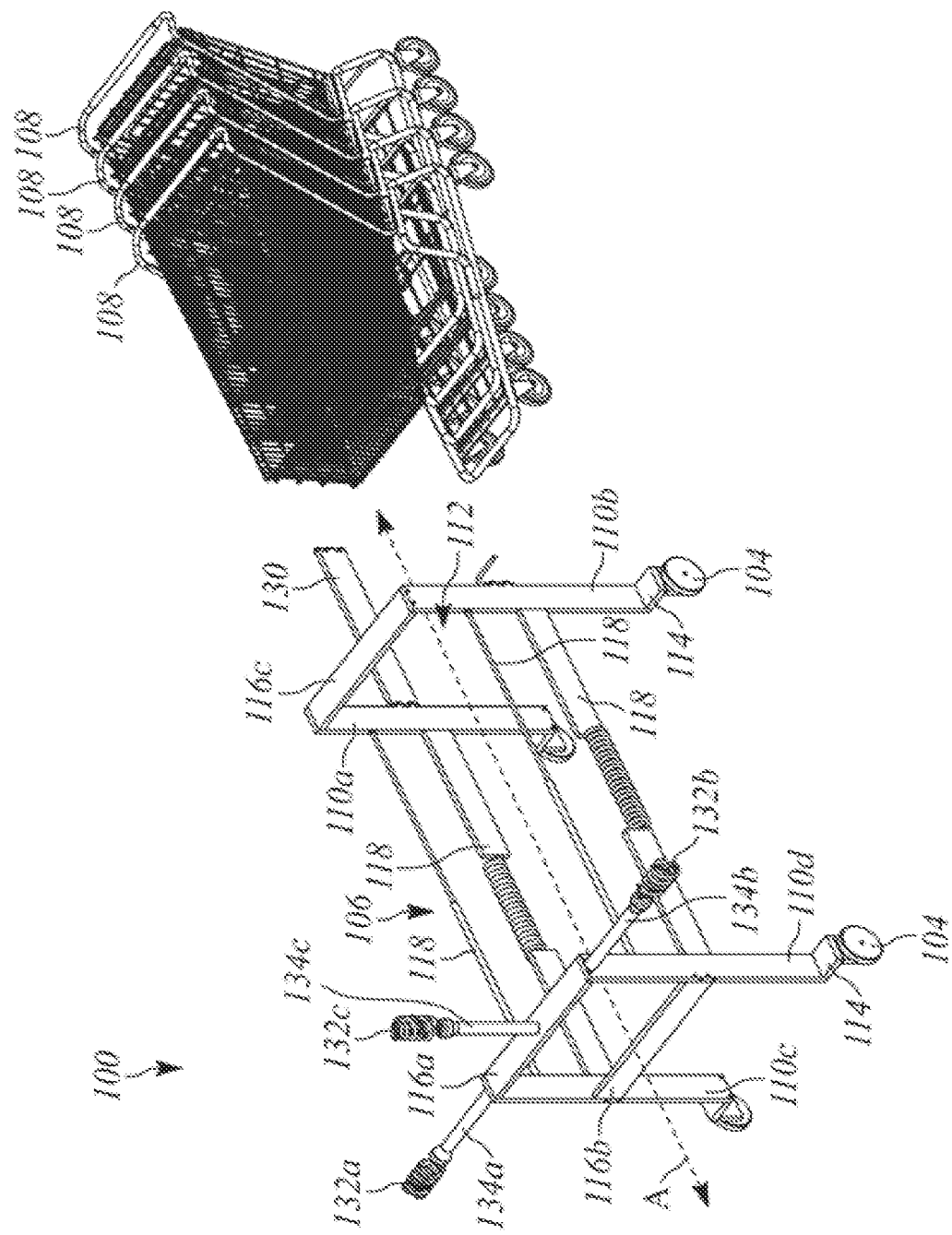
FIG. 1 is a perspective view of a shopping cart corral, according to an illustrative embodiment.
Figure 2:
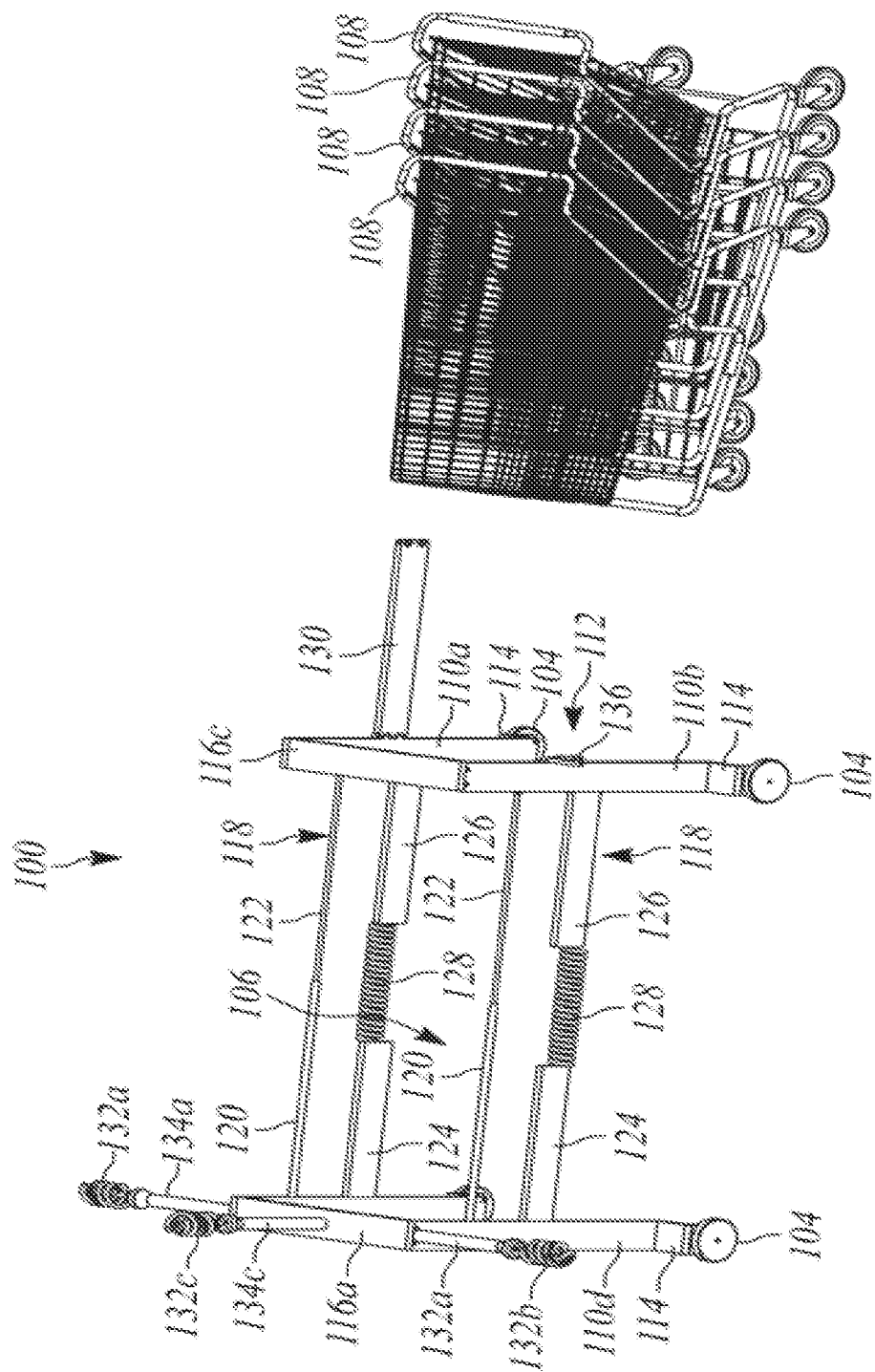
FIG. 2 is an elevated perspective view of the shopping cart corral of FIG. 1, according to an illustrative embodiment.
Figure 3:
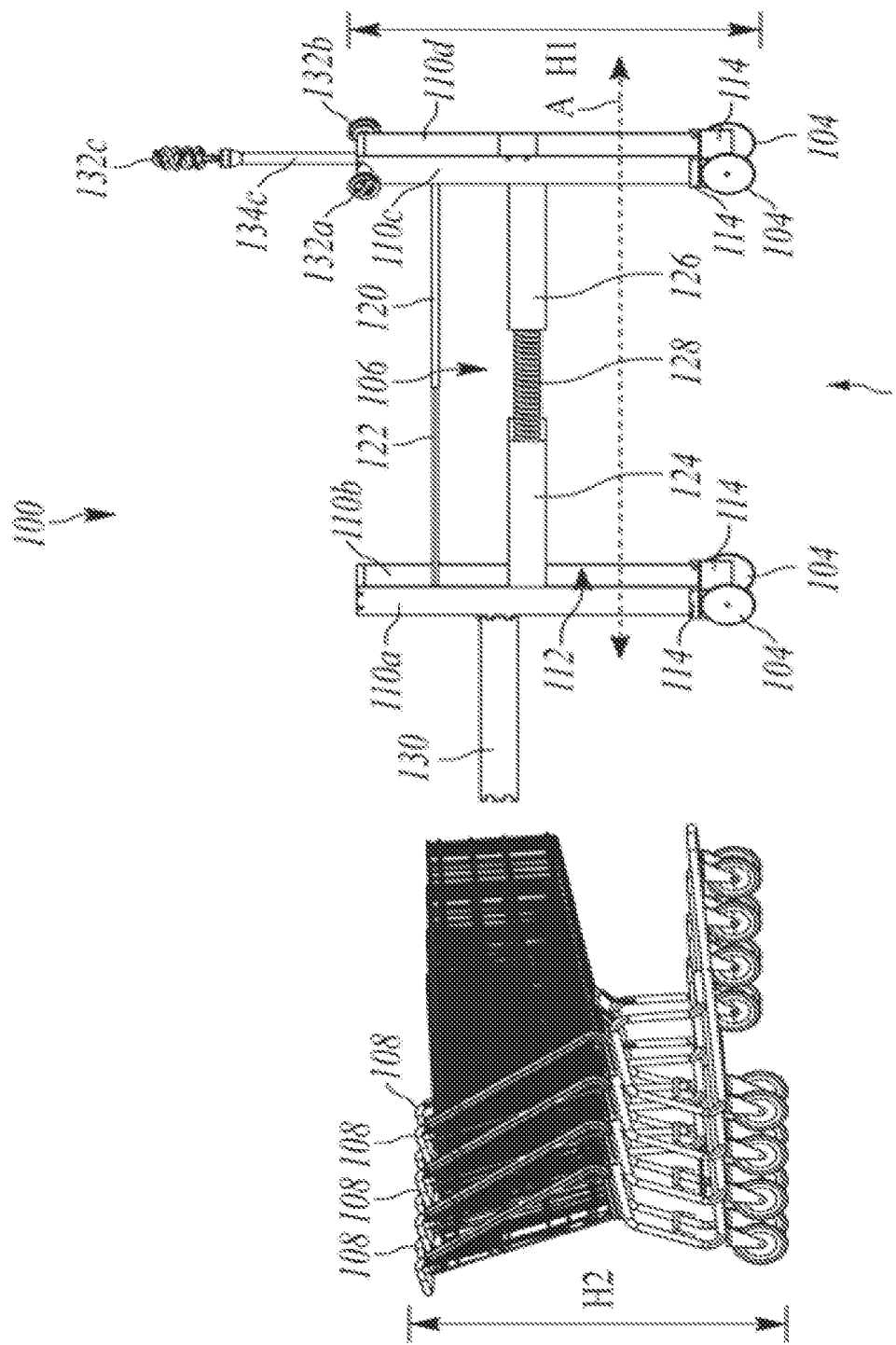
FIG. 3 is a side view of the shopping cart corral of FIG. 1, according to an illustrative embodiment.
Figure 4:
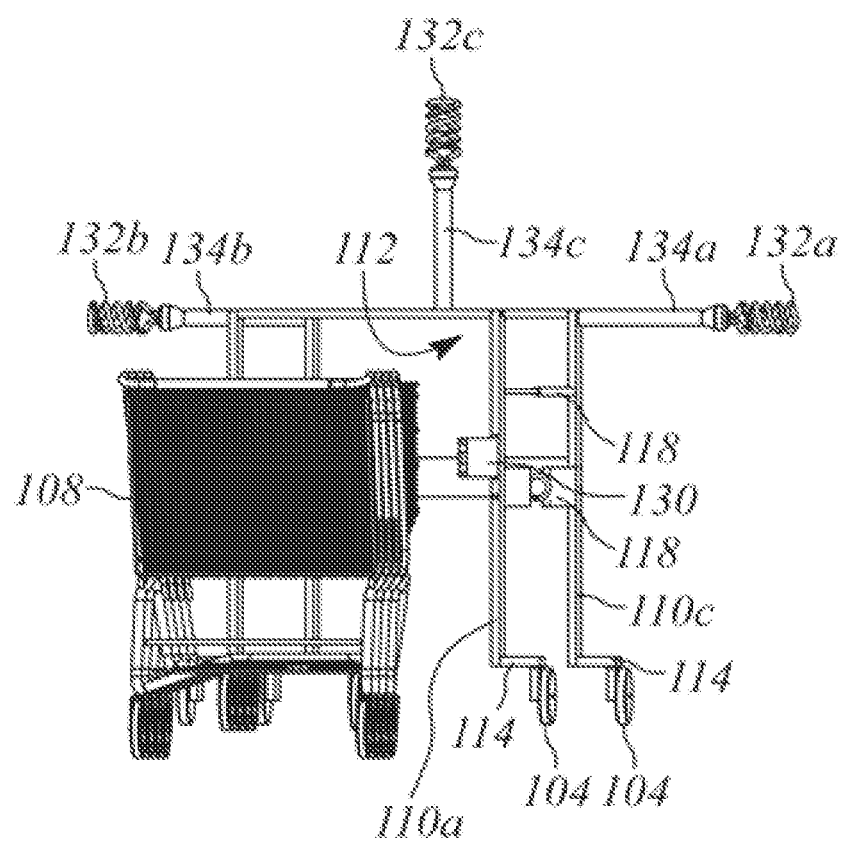
FIG. 4 is a rear view of the shopping cart corral of FIG. 1 as shopping carts are being positioned therein, according to an illustrative embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, systems and devices for a shopping corral are described. The shopping cart corral may include a movable frame defining an interior space sized to receive one or more shopping carts arranged along a lengthwise direction in the interior space. The movable frame may include a first expandable wall configured to expand in the lengthwise direction. The first expandable wall may have a first post, a second post, and a first extendable bracket extending between the first post and the second post. The movable frame may include a second expandable wall configured to expand in the lengthwise direction. The second expandable wall may have a third post, a fourth post, and a second extendable bracket extending between the third post and a fourth post. The movable frame may include a third wall having a third bracket extending between the first post and the third post defining a third wall. The movable frame may include a door extending between the second post and the fourth post and configured to open and close to selectively expose the interior space. The shopping cart corral may include a plurality of wheels including a first wheel positioned on the first post, a second wheel positioned on the second post, a third wheel positioned on the third post, and a fourth wheel positioned on the fourth post.

According to the embodiments described herein, since the shopping cart corral includes the movable frame, the shopping carts can be quickly and conveniently moved back from the parking lot to the shopping space for after-hour storage. Furthermore, because the first and second walls are expandable, the interior space can expand to house more shopping carts aligned in the lengthwise direction. Such embodiments can provide for the transportation and movement of several shopping carts at once. In some embodiments, the shopping cart corral can include one or more light sources. Such light sources can provide a visual indication to customers of the nearest shopping cart corral in the shopping space, which may increase the likelihood that customers return a used shopping cart to the shopping cart corral, rather than leaving the used shopping cart next to the customer's vehicle in the parking lot. Various other benefits of the present disclosures are described in further detail below.

Referring now to FIGS. 1-5, depicted are several views of a shopping cart corral 100, according to an exemplary embodiment. The shopping cart corral 100 may include a movable frame 102 and a plurality of wheels 104. The movable frame 102 may define an interior space 106, which is configured to receive one or more shopping carts 108 arranged in a lengthwise direction (along axis A) within the frame 102. The movable frame 102 may be constructed from steel, aluminum, harden plastic, or other rigid materials or combinations of materials. The movable frame 102 may include a plurality of posts 110 defining corners of the movable frame 102. Specifically, the movable frame 102 may include a first post 110a and a second post 110b arranged at a front of the movable frame 102 adjacent an opening 112 to the interior space 106 for the movable frame 102. The movable frame 102 may further include a third post 110c and a fourth post 110d arranged at a rear of the movable frame 102.

Each of the wheels 104 may be mounted, attached, or otherwise coupled to a respective post 106. In some embodiments, one or more of the wheels 104 may be configured to rotate in 360 degrees (e.g., one or more of the wheels 104 may be castor wheels). For example, the wheels 104 coupled to the first and second post 110a, 110b may be castor wheels to provide for rotation of a rear of the shopping cart corral 100. In some embodiments, one or more of the wheels 104 may include a locking mechanism (such as a stop pin, a locking tab, etc.). The locking mechanism may be configured to prevent rotation of the wheel(s) 104, such as when one or more shopping carts 108 are being positioned in the shopping cart corral 100. For example, the wheels 104 coupled to the third and fourth posts 110c, 110d may include a locking mechanism to prevent rotation of such wheels 104 as the shopping carts 108 are being positioned in the shopping cart corral 100.

In some embodiments, the wheels 104 may be coupled to an extension 114 arranged along a bottom of the respective post 106, such that the wheels 104 extend outwardly from the post 106. For example, each post 106 may include an extension 114 which extends outwardly away from (e.g., perpendicular to) the interior space 106. The extension 114 may be coupled to a bottom of the respective post 106 at a first end. The extension 114 may include a wheel 104 coupled to the extension 114 at a second end opposite the first end such that the wheels 104 are mounted at an offset distance from the movable frame 102. Such an offset may provide for increased stability in movement of the movable frame 102 with shopping carts 108 positioned therein. The posts 106 and wheels may be sized such that a height H1 of the movable frame 102 is greater than a height H2 of the shopping cart 108.

The movable frame 102 may include a plurality of brackets. In some embodiments, the movable frame 102 may have a combination of rigid brackets and extendable brackets. For example, the movable frame 102 may include upper and lower rigid brackets 116a, 116b arranged along the rear of the movable frame 102, and an upper rigid bracket 116c arranged along the front of the movable frame 102 adjacent the opening 112. The rigid brackets 116 may define front and rear walls of the movable frame 102. In some embodiments, the upper rigid brackets 116a, 116c may extend along a plane which is parallel to the axis A (e.g., such that the upper rigid brackets 116a, 116c extend horizontally), and the lower rigid bracket 116b may extend along a plane which is perpendicular to the axis A (e.g., such that the lower rigid bracket 116b extends vertically).

The movable frame 102 may include a plurality of extendable brackets 118, which define side walls of the movable frame 102. In some embodiments, the movable frame 102 may include a first and second extendable bracket 118a, 118b at one side wall of the movable frame 102, and a third and fourth extendable bracket 118c, 118d at the other side wall of the movable frame 102. Each extendable bracket 118 may be configured to extend along the lengthwise direction of the movable frame 102 (e.g., along axis A). As such, the extendable brackets 118 may be configured to expand the interior space 106 to fit additional shopping carts 108 when arranged in the lengthwise direction by extending along the lengthwise direction.

In some embodiments, the extendable brackets 118 may include telescopic brackets. For example, and as shown in FIGS. 1-5, the first and third extendable brackets 118a, 118c may be telescopic brackets. Each of the telescopic brackets may include a first portion 120 and a second portion 122 sized to slide along and within the first portion 120. While shown as two portions, it is noted that the telescopic brackets may include one or more additional portions (e.g., a third portion sized to slide along and within the second portion, a fourth portion sized to slide along and within the third portion, and so forth). In use, the second portions 122 of the telescopic brackets can slide together (e.g., in unison) relative to the first portions 120 to extend a length of the telescopic bracket. As such, a distance between the first and third posts 110a, 110c (and second and fourth posts 110b, 110d) can increase to thereby increase the interior space 106 to accommodate additional shopping carts 108. Furthermore, the telescopic brackets may provide for increased rigidity of the movable frame 102 by preventing or decreasing the likelihood of lateral movements of the first and second posts 110a, 110b relative to the second and third posts 110c, 110d when the movable frame 102 is in motion.

In some embodiments, the extendable brackets 118 may include spring brackets. For example, and as shown in FIGS. 1-5, the second and fourth extendable bracket 118b, 118d may be spring brackets. The spring brackets may include a first bracket portion 124, a second bracket portion 126, and an extendable connector 128 connected to the first bracket portion 124 and second bracket portion 126. The first bracket portion 124 and second bracket portion 126 may be rigid brackets (similar to the rigid brackets 116 described above). The extendable connector 128 may be a spring. The spring can be biased to expand along axis A, while pulling the first bracket portion 124 towards the second bracket portion 126. In some embodiments, the spring brackets can work cooperatively with the telescopic brackets. For example, as the telescopic brackets are pulled to expand along the lengthwise direction, the spring brackets can pull the first bracket portion 124 towards the second bracket portion 126 to maintain the distance between the first and third posts 110a, 110c (and second and fourth posts 110b, 110d) to increase to thereby increase the interior space 106 to accommodate additional shopping carts 108.

While shown as having both telescopic brackets and spring brackets, in some embodiments, the movable frame 102 may include various combinations of telescopic brackets and/or spring brackets (for example, two or more spring brackets, two or more telescopic brackets, and/or various combinations of both telescopic and spring brackets). In these and other embodiments, the extendable brackets 118 may provide extension of the movable frame 102 along the lengthwise direction to accommodate for additional shopping carts 108 in the lengthwise direction.

The movable frame 102 may include a door 130. The door 130 may extend between the first and second posts 110a, 110b. The door 130 may be coupled to one post 110a, 110b via a hinge such that the door 130 can pivot between open and closed positions (shown in FIG. 1-FIG. 4 and FIG. 6, and FIG. 5 and FIG. 7, respectively). The door 130 may include a locking mechanism 136 (such as a latch) configured to lock the door 130 in the closed position. In some embodiments, the door 130 may include locking mechanisms 136 at both ends of the door 130 such that the door 130 can be opened and closed from both sides (e.g., and pivot along the locked locking mechanism 136). In use, a customer or employee can unlock the locking mechanism 136 to open the door 130 to expose the opening 112, push a shopping cart 108 through the opening 112 into the interior space 106, and close and lock the door 130 to lock the shopping cart 108 into the interior space 106. As the door 130 is locked, the door 130 may press against a rear of the shopping cart(s) 108 while the front rigid bracket 116b presses against a front of the shopping cart(s) 108, to sandwich the shopping cart(s) 108 between the rigid bracket 116b and door 130. Such embodiments may provide an opposing force to a force of the extension brackets 118, to thereby maintain a distance between the front and rear of the movable frame 102.

Figure 5:
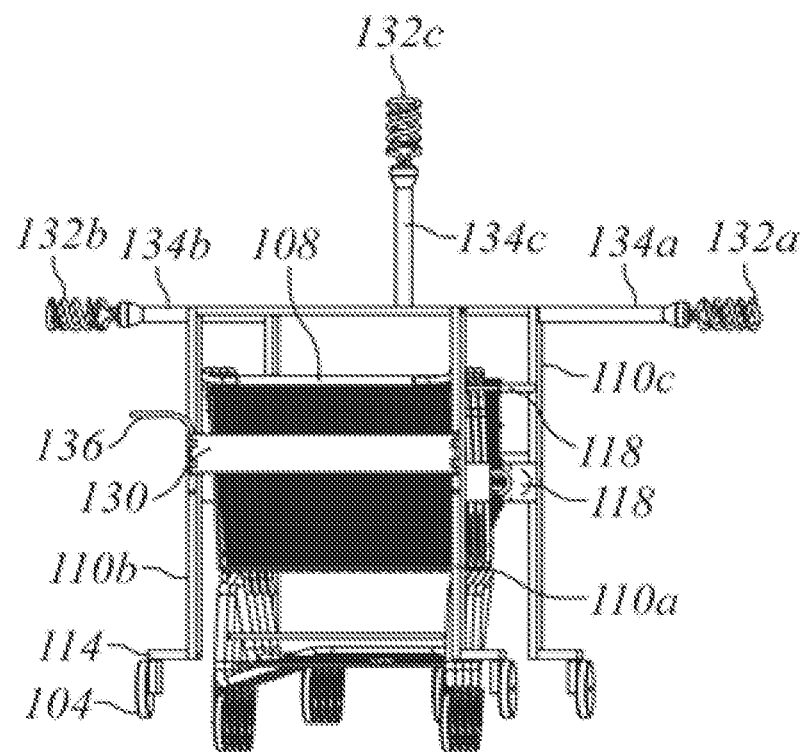
FIG. 5 is a rear view of the shopping cart corral of FIG. 4 with the shopping carts positioned therein, according to an illustrative embodiment.

In some embodiments, the door 130 may be arranged at an offset distance from the rigid bracket 116c to provide passage for a handle or push bar of the shopping carts 108 to extend therethrough (as shown in FIG. 5). For example, the door 130 may be arranged at a halfway point or portion of the first and second posts 110a, 110b, a third of the length of the first and second posts 110a, 110b from the rigid bracket 116c, etc. As shown in FIG. 5, when the door 130 is locked in the closed position, a push bar of the shopping carts 108 extends through the passage formed between the rigid bracket 116c and door 130 to allow an employee or other person to move the shopping cart corral 100 including each of the shopping carts 108 arranged therein.

In some embodiments, the shopping cart corral 100 may include one or more light sources 132. In some embodiments (such as those shown in FIG. 1-FIG. 5), the shopping cart corral 100 may include a plurality of light sources 132. The light sources 132 may be configured to extend outwardly from the movable frame 102. In some embodiments, the light sources 132 may be attached, connected, or otherwise coupled to one or more of the rigid brackets 116 (such as the rigid bracket 116a). As shown in FIGS. 1-5, the light sources 132 may be mounted to an extender 134 which extends outwardly from the rigid bracket 116a. For example, the shopping cart corral 100 may include a first light source 132a, a second light source 132b, and a third light source 132b which are coupled to respective extenders 134a-134c. The first light source 132a may be coupled to a first extender 134a extending outwardly from the rigid bracket 116a perpendicular (or substantially perpendicular) to the side wall defined by the first and third posts 110a, 110c. Similarly, the second light source 132b may be coupled to a second extender 134b extending outwardly from the rigid bracket 116a perpendicular (or substantially perpendicular) to the side wall defined by the second and fourth posts 110b, 110d. The third light source 132c may be coupled to an extender 134c extending outwardly from the rigid bracket 116a substantially parallel to the rear wall defined by the third and fourth posts 110c, 110d.

The light sources 132 may be solar-powered light sources. For example, one or more of the upwardly-facing surfaces (such as rigid brackets 116a, 116c) may include solar panels which convert solar power into electrical energy for powering the light sources 132. In some embodiments, each light source 132 may include a dedicated solar panel. In some embodiments, each light source 132 may be powered by a common solar panel (or common solar panels). In use, the light sources 132 may illuminate to draw attention of customers who have completed shopping and have returned to the parking lot, thereby increasing the likelihood that the customers see the shopping cart corral 100 and return their used shopping carts 108 to the shopping cart corral (rather than leaving the shopping cart 108 in the parking lot adjacent their vehicle).

Figure 6:
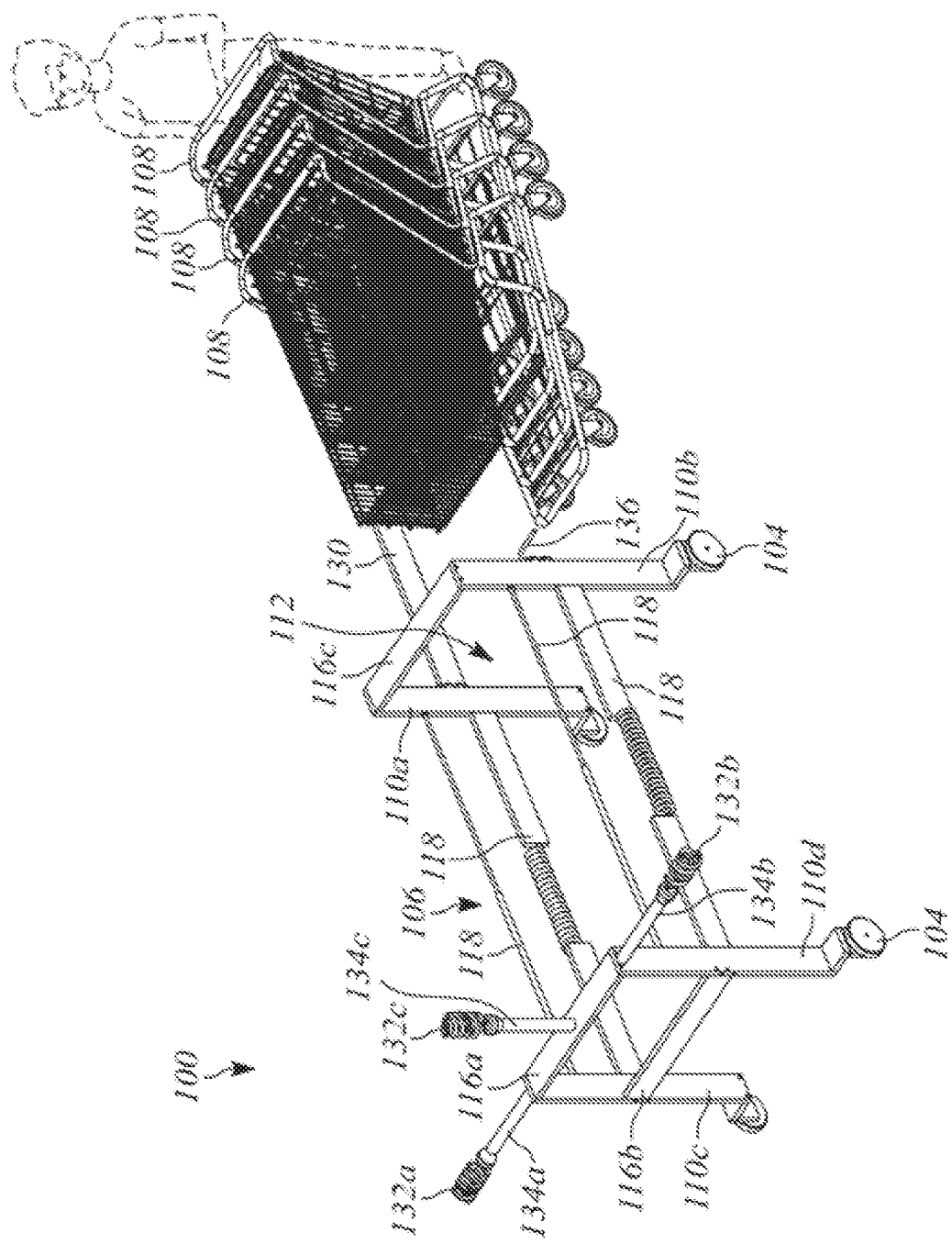
FIG. 6 and FIG. 7 are perspective views of an example use case of the shopping cart corral of FIG. 1, according to an illustrative embodiment.
Figure 7:
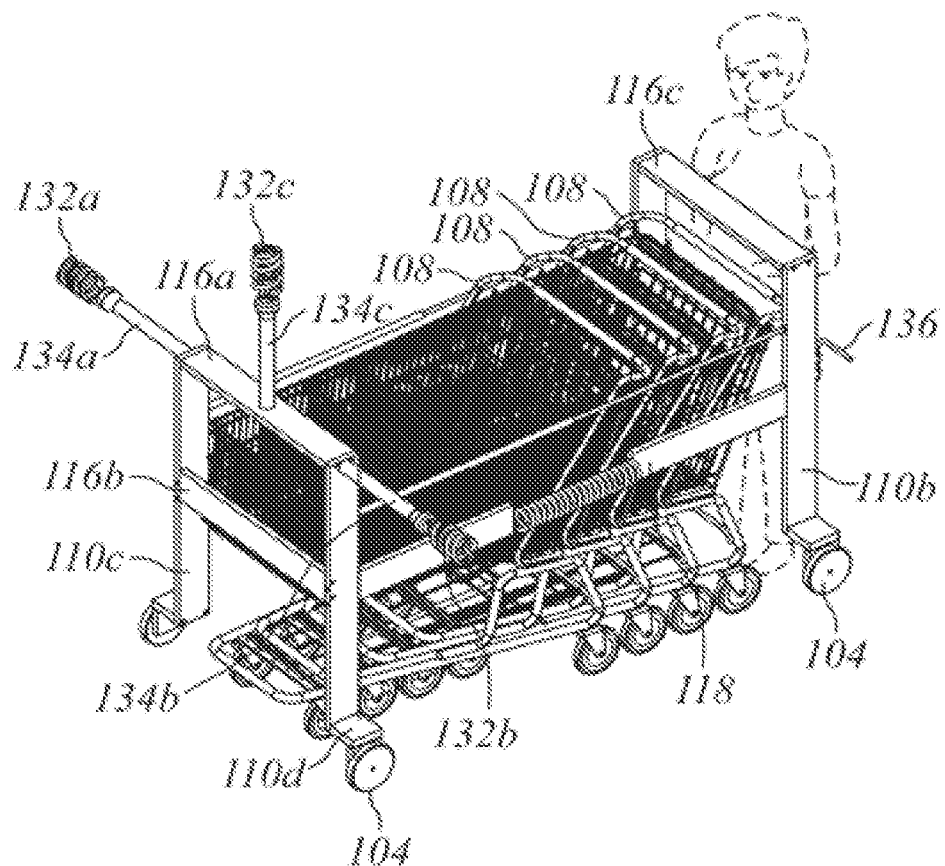

Referring now to FIG. 6 and FIG. 7, depicted are perspective views of a use case of the shopping cart corral 100, according to illustrative embodiments. In particular, FIG. 6 and FIG. 7 show views of a user loading or positioning shopping carts 108 into the shopping cart corral 100, such that the shopping carts 108 are contained within the shopping cart corral 100. In use, a user may unlock the door 130 (e.g., by removing the locking mechanism 132 from a pin holder, unlatching the door 130, etc.) to allow the door 130 to pivot open. Additionally, and in some embodiments, the user may lock one or more of the wheels 104 (such as the wheels 104 coupled to the posts 110c, 110d) to prevent the wheels 104 from moving as the shopping carts 108 are positioned into the shopping cart corral 100. The user may lock the wheels 104 by switching a tab on the wheels 104, positioning moving a pin into the wheels 104, or otherwise engaging the locking mechanism to prevent rotation of the wheels 104.

Once the user has prepared the shopping cart corral 100 for receiving shopping carts 108 (e.g., by unlocking the door 130 and optionally locking one or more wheels 104), the user may then push the shopping carts 108 through the opening 112 and into the interior space 106. The user 108 may push the shopping carts 108 into the interior space 106 and up against the rigid bracket 116*b*. Once the shopping carts 108 press against the rigid bracket 116*b*, and if the shopping carts 108 are contained within the interior space 106 such that the user can shut the door 130 without the extension brackets 118 needing to further extend, the user may then close the door 130 and lock the door 130 using the locking mechanism 136.

In instances where the shopping carts 108 are not contained within the interior space 106 (e.g., a portion of at least one shopping cart 108 extends beyond the posts 110*a*, 110*b*), the user may push the shopping carts 108 into the interior space 106 while simultaneously pulling the upper rigid bracket 116*c* to cause the extendable brackets 118 to extend along the axis A, thereby expanding the interior space 106 to accommodate for the shopping carts 108.

Once the shopping carts 108 press against the rigid bracket 116*b* and the extendible brackets 118 have extended sufficiently to expand the interior space 106 for accommodating the shopping carts 108, the user may shut and lock the door 130 (e.g., using the locking mechanism 136). Upon locking the door 130, the door 130 and rigid bracket 116*b* may press against opposing sides of the shopping carts 108 to balance opposing forces of the shopping cart corral 100 and thereby maintain the extended length of the extendable brackets 118. The user may then transport the shopping carts 108 by pushing the push bar of the rear-most shopping cart 108, which extends outwardly from the shopping cart corral 100 (e.g., between the door 130 and rigid bracket 116*c*), thereby moving the shopping cart corral 100 with the shopping carts 108 contained therein.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that any element disclosed in one embodiment may be incorporated or utilized with any other embodiment disclosed herein. As such, it should be appreciated that elements of the various embodiments may be incorporated or utilized with any of the other embodiments disclosed herein.

What is claimed is:

1. A shopping cart corral comprising:
   a movable frame defining an interior space sized to receive one or more shopping carts arranged along a lengthwise direction in the interior space, the movable frame comprising:
   a first expandable wall configured to expand in the lengthwise direction, the first expandable wall having a first post, a second post, and a first extendable bracket extending between the first post and the second post;
   a second expandable wall configured to expand in the lengthwise direction, the second expandable wall having a third post, a fourth post, and a second extendable bracket extending between the third post and the fourth post;
   a third wall having a third bracket extending between the first post and the third post;
   a door extending between the second post and the fourth post and configured to open and close to selectively expose the interior space; and
   a plurality of wheels including a first wheel positioned on the first post, a second wheel positioned on the second post, a third wheel positioned on the third post, and a fourth wheel positioned on the fourth post.

2. The shopping cart corral of claim 1, wherein one or more of the plurality of wheels are castor wheels.

3. The shopping cart corral of claim 1, wherein the movable frame further includes a fourth bracket extending between a top of the first post and a top of the third post, the fourth bracket comprising at least one light source.

4. The shopping cart corral of claim 3, wherein the at least one light source comprises a first light source extending from the first post, a second light source extending from the third post, and a third light source extending from the fourth bracket.

5. The shopping cart corral of claim 3, wherein the at least one light source is a solar-powered light source.

6. The shopping cart corral of claim 1, wherein the door comprises a locking mechanism configured to selectively maintain a position of the door relative to the second post and the fourth post.

7. The shopping cart corral of claim 1, wherein the first extendable bracket and the second extendable bracket each comprise:

a first bracket portion and a second bracket portion; and
an extendable connector connected to the first bracket portion and the second bracket portion.

8. The shopping cart corral of claim 7, wherein the extendable connector comprises a spring.

9. The shopping cart corral of claim 1, wherein at least one of the plurality of wheels include a locking mechanism configured to prevent rotation of the at least one wheel relative to another wheel.

10. A shopping cart corral comprising:
a movable frame defining an interior space sized to receive one or more shopping carts arranged along a lengthwise direction in the interior space, the movable frame comprising:
a first wall having a first post, a second post, and a first extendable bracket extending along the lengthwise direction between the first post and the second post;
a second wall having a third post, a fourth post, and a second extendable bracket extending along the lengthwise direction between the third post and the fourth post;
a third wall having a third bracket extending between the first post and the third post, the third wall comprising a light source;
a door extending between the second post and the fourth post and configured to open and close to selectively expose the interior space; and
a plurality of wheels including a first wheel positioned on the first post, a second wheel positioned on the second post, a third wheel positioned on the third post, and a fourth wheel positioned on the fourth post.

11. The shopping cart corral of claim 10, wherein one or more of the plurality of wheels are castor wheels.

12. The shopping cart corral of claim 10, wherein the light source comprises a first light source extending outwardly from the first post, a second light source extending outwardly from the third post, and a third light source extending outwardly from a fourth bracket extending between the first post and the third post.

13. The shopping cart corral of claim 12, wherein the light source is a solar-powered light source.

14. The shopping cart corral of claim 10, wherein the first extendable bracket and the second extendable bracket each comprise:
a first bracket portion and a second bracket portion; and
a spring connected to the first bracket portion and the second bracket portion.

15. The shopping cart corral of claim 10, wherein the first extendable bracket comprises a first telescopic bracket and the second extendable bracket comprises a second telescopic bracket.

16. A shopping cart system comprising:
a plurality of shopping carts; and
a shopping cart corral sized to receive one or more of the plurality of shopping carts, the shopping cart corral comprising:
a movable frame defining an interior space sized to receive the one or more shopping carts arranged along a lengthwise direction in the interior space, the movable frame comprising:
a first expandable wall configured to expand in the lengthwise direction, the first expandable wall having a first post, a second post, and a first extendable bracket extending between the first post and the second post;
a second expandable wall configured to expand in the lengthwise direction, the second expandable wall having a third post, a fourth post, and a second extendable bracket extending between the third post and the fourth post;
a third wall including a third bracket extending between the first post and the third post;
a door extending between the second post and the fourth post and configured to open and close to selectively expose the interior space; and
a plurality of wheels including a first wheel positioned on the first post, a second wheel positioned on the second post, a third wheel positioned on the third post, and a fourth wheel positioned on the fourth post.

17. The shopping cart system of claim 16, wherein the movable frame comprises a fourth bracket extending between a top of the first post and a top of the third post, the fourth bracket comprising at least one light source.

18. The shopping cart system of claim 17, wherein the at least one light source comprises a first light source extending outwardly from the first post in a first direction, a second light source extending outwardly from the third post in a second direction, and a third light source extending from the fourth bracket in a third direction.

19. The shopping cart system of claim 16, wherein the first extendable bracket and the second extendable bracket each comprise:
a first bracket portion and a second bracket portion; and
an extendable connector connected to the first bracket portion and the second bracket portion.

* * * * *